United States Patent
Coots et al.

(10) Patent No.: US 6,582,090 B1
(45) Date of Patent: Jun. 24, 2003

(54) METHOD AND APPARATUS FOR ILLUMINATING LEADS OF A COMPONENT

(75) Inventors: Charles A. Coots, Binghamton, NY (US); John E. Danek, Vestal, NY (US); George D. Eck, Binghamton, NY (US); Michael J. Gorenflo, Castle Creek, NY (US)

(73) Assignee: Delaware Capital Formation, Wilmington, DE (US)

( * ) Notice: Subject to any disclaimer, the term of this patent is extended or adjusted under 35 U.S.C. 154(b) by 0 days.

(21) Appl. No.: 09/384,767

(22) Filed: Aug. 27, 1999

(51) Int. Cl.[7] .............................................. G03B 15/02
(52) U.S. Cl. ............................ 362/11; 362/16; 362/18; 362/17; 362/324; 362/239
(58) Field of Search ................................ 362/11, 12, 3, 362/16, 326, 244, 234, 18, 239, 250, 800, 17

(56) References Cited

U.S. PATENT DOCUMENTS

| | | | | |
|---|---|---|---|---|
| 4,101,259 A | * | 7/1978 | Shaffer et al. ................ 431/93 |
| 4,678,336 A | * | 7/1987 | Tsunoda ...................... 356/380 |
| 5,347,431 A | * | 9/1994 | Blackwell et al. ............ 362/11 |
| 5,481,439 A | * | 1/1996 | Goto .............................. 362/5 |
| 5,515,253 A | * | 5/1996 | Sjobom ....................... 362/244 |
| 5,690,417 A | * | 11/1997 | Polidor et al. .............. 362/244 |
| 5,697,699 A | * | 12/1997 | Seo et al. ................... 362/252 |
| 5,897,195 A | * | 4/1999 | Choate ......................... 362/33 |
| 6,106,124 A | * | 8/2000 | Tarsia ............................ 362/6 |
| 6,352,349 B1 | * | 3/2002 | Braginsky et al. ............. 362/8 |

\* cited by examiner

*Primary Examiner*—Sandra O'Shea
*Assistant Examiner*—Anabel Ton
(74) *Attorney, Agent, or Firm*—Burns, Doane, Swecker & Mathis, L.L.P.

(57) ABSTRACT

An apparatus and method for compound angle illumination of items such as electronic components and features on those components that are within a field of view of a camera. Illumination assemblies are provided on opposite sides of the components, where illumination criss-crosses the component and its features. The illumination assemblies are also tilted at a vertical angle relative to the component. Light emitting diodes are used as a light source and, in one embodiment, refracting prisms are provided to refract the light from the LED's to provide the criss-cross illumination.

15 Claims, 5 Drawing Sheets

METHOD AND APPARATUS FOR ILLUMINATING LEADS OF A COMPONENT

FIELD OF THE INVENTION

This invention relates to a system and method for providing uniform illumination of items, such as electronic components for purposes of vision system component image recognition and inspection.

BACKGROUND OF THE INVENTION

With regard to electronic components, various methods of illumination have been utilized in order to illuminate all of the features of the components, as it is necessary that the components be adequately illuminated so that automated machine vision systems can operate for purposes of component image recognition and also vision system component inspection, where a camera, in association with sophisticated machine vision software, obtains image information concerning the components, and the machine vision software performs any number of well known analyses of the image information. For example, the image information is analyzed to determine whether a component is present, for component identification and inspection, and for determining location information concerning the component in order to obtain accurate placement of the component on a printed circuit board. Types of features to be illuminated include leads which extend out or away from the component body in any direction, spherical bumps, outer perimeter features of the components, etc.

Prior art methods of illumination include mounting light sources on all four sides of a component to provide 45° angle of incidence illumination of the component, providing light to all sides of the component.

High angle illumination (high angle with respect to the optical axis) is often required to illuminate certain kinds of features of components, such as spherical bumps. One way in the prior art of accomplishing such high angle illumination is to provide lighting boards on all four sides of the component, where the lighting boards are tipped at approximately 5° from the body plane of the component. This, in essence, provides a ring of light sources surrounding the component.

These prior art methods have a number of disadvantages, a significant one being that light sources must be provided on all four sides of the components. This presents a problem where there are a series of placement spindles next to one another, each spindle holding an individual component to be illuminated, and it is not possible to position illumination sources between each placement spindle.

SUMMARY OF THE INVENTION

The present invention relates to a method of providing compound angle illumination on a first side of an item, such as an electronic component and providing compound angle illumination on a second side of the component. An aspect of the method of the present invention also comprises tilting vertically the sources for the component illumination.

The present invention also relates to an apparatus that provides compound angle illumination on a first side of an item, such as an electronic component and on a second side of the electronic component. A first illumination assembly provides the illumination of the first side of the component and a second illumination assembly provides the illumination for the second side of the component. Substantially uniform illumination of the component or features of the component within the field of view of a camera is obtained. In one aspect of the invention, the light sources in the illumination assemblies are light emitting diodes and a refracting prism is utilized to refract the light from the LED's at angles that result in criss-cross illumination of the component.

DETAILED DESCRIPTION

An embodiment of the present invention utilizes light from only two sides of an item, such as an electronic component, with the light oriented in a criss-cross, compound angle fashion such that substantially all portions of the component are covered by the illumination without the need for light sources on all four sides of the component.

Figure 1:
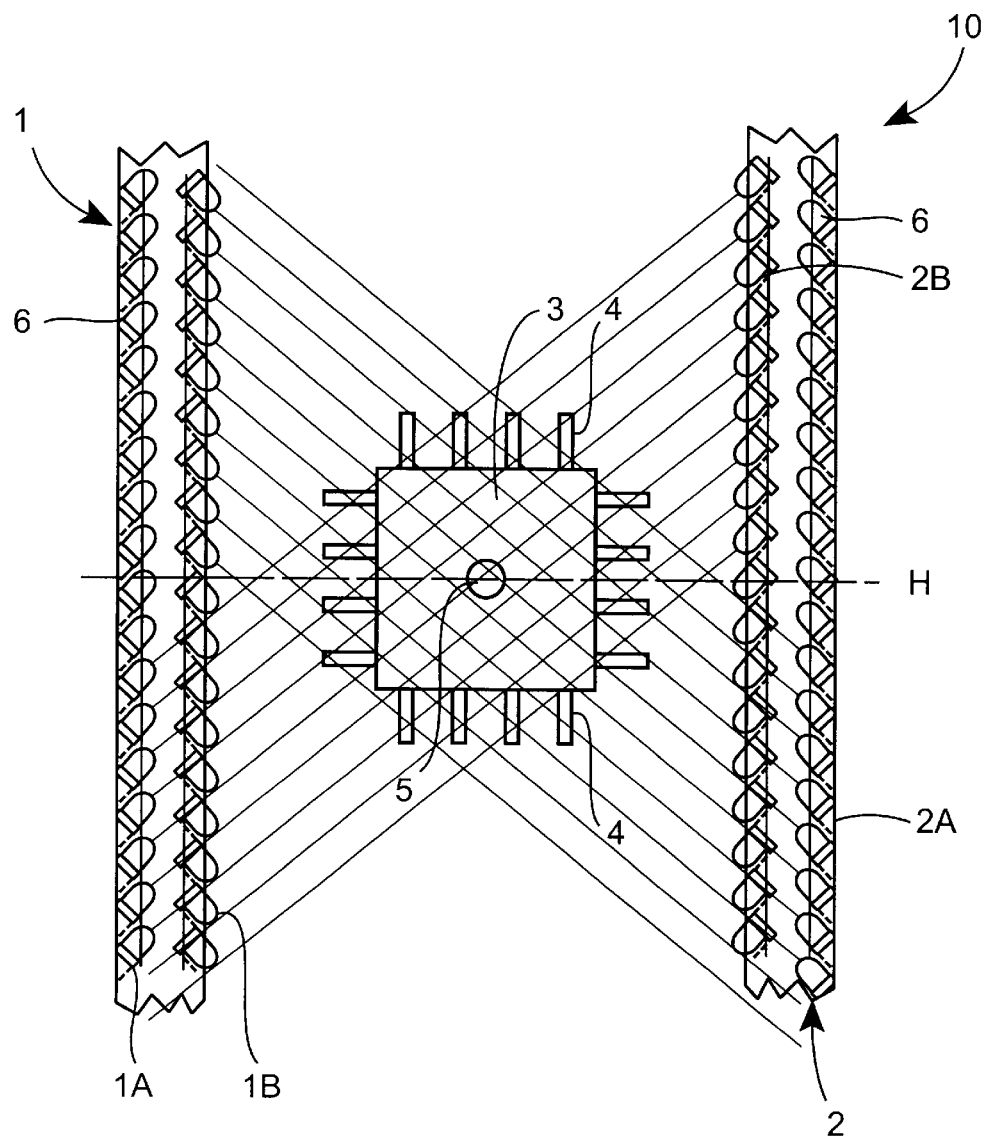
FIG. 1 is a top plan view of an embodiment of an illumination system of the present invention having two front lighting illumination assemblies positioned on either side of an item, such as an electronic component, each illumination device comprising two columns of light emitting diodes, a first column of LED's being aligned at approximately +45° relative to a horizontal axis through the component, and a second column of LED's being aligned at approximately −45° relative to the horizontal axis through the component.
Figure 2:
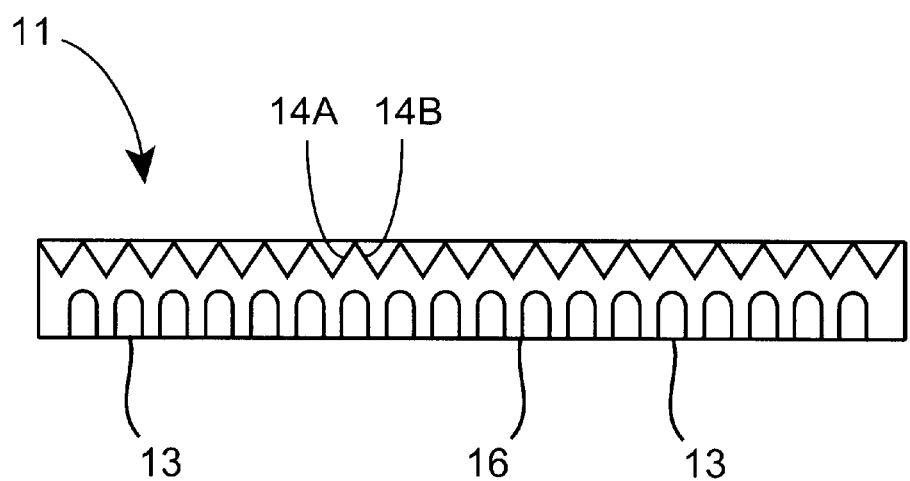
FIG. 2 is an elevational view in isolation of a further embodiment of the invention, wherein a front lighting assembly comprises a printed circuit board populated with light emitting diodes, drive circuitry and a refractor prism assembly.

One method and system of the present invention, as shown in FIG. 1, is to orient the light sources (for example, light emitting diodes (LED's)) on a printed circuit board with drive circuitry at approximately 45° and then tipping the printed circuit board with the LED's at a vertical angle relative to the component, for example, in the range of 40°–50°, resulting in a compound angle illumination. In FIG. 1, the illumination system 10 has two illumination assemblies, 1 and 2, for illuminating the component 3, having leads 4. The component 3 is held on spindle 5 of the placement machine. Spindle 5 can best be seen in FIGS. 4 and 6, in relation to another embodiment of the invention.

The first illumination assembly 1 is positioned on a first side of the component 3. The second illumination assembly 2 is positioned on a second side of the component 3.

Each illumination assembly 1 and 2, in the embodiment shown in FIG. 1, consists of two rows of LED's 6, the first row on each device, designated as 1A and 2A in FIG. 1, consists of LED's 6 arranged such that the light from each LED in rows 1A and 2A is directed at the component 3 at an angle of approximately +45° relative to the horizontal axis H through the component 4. Similarly, the light from LED's in the second rows of devices 1 and 2, namely rows 1B and 2B, respectively, is directed at an angle of −45° relative to the horizontal axis H of the board 5. Also, the illumination assembles 1 and 2 are tilted in the vertical plane relative to the component 3, for example, in the range of 40°–50°. (This vertical angle tilt of assemblies 1 and 2 is the same or very similar to the vertical tilt of the illumination assemblies 11 and 12 shown in the perspective view of the embodiment shown in FIG. 4.) In this way, the light rays criss-cross the image plane from two adjacent sides and at compound angles due to the tilting angle of the illumination assemblies 1 and 2 to provide illumination to all four sides of the component 3, as shown schematically in FIG. 1. This is beneficial for component placement heads with multiple placement spindles 5 that are in-line with one another and that are in close proximity, as there is no room for light sources to be placed between spindles.

Another embodiment of the present invention is shown in FIGS. 2–5. In this embodiment, two illumination assemblies 11 and 12 comprise LED's 13 mounted with drive circuitry on printed circuit boards 16 and 17. A refractor prism assembly 14 is mounted on the illumination assemblies 11 and 12 over the LED's 13.

Figure 4:
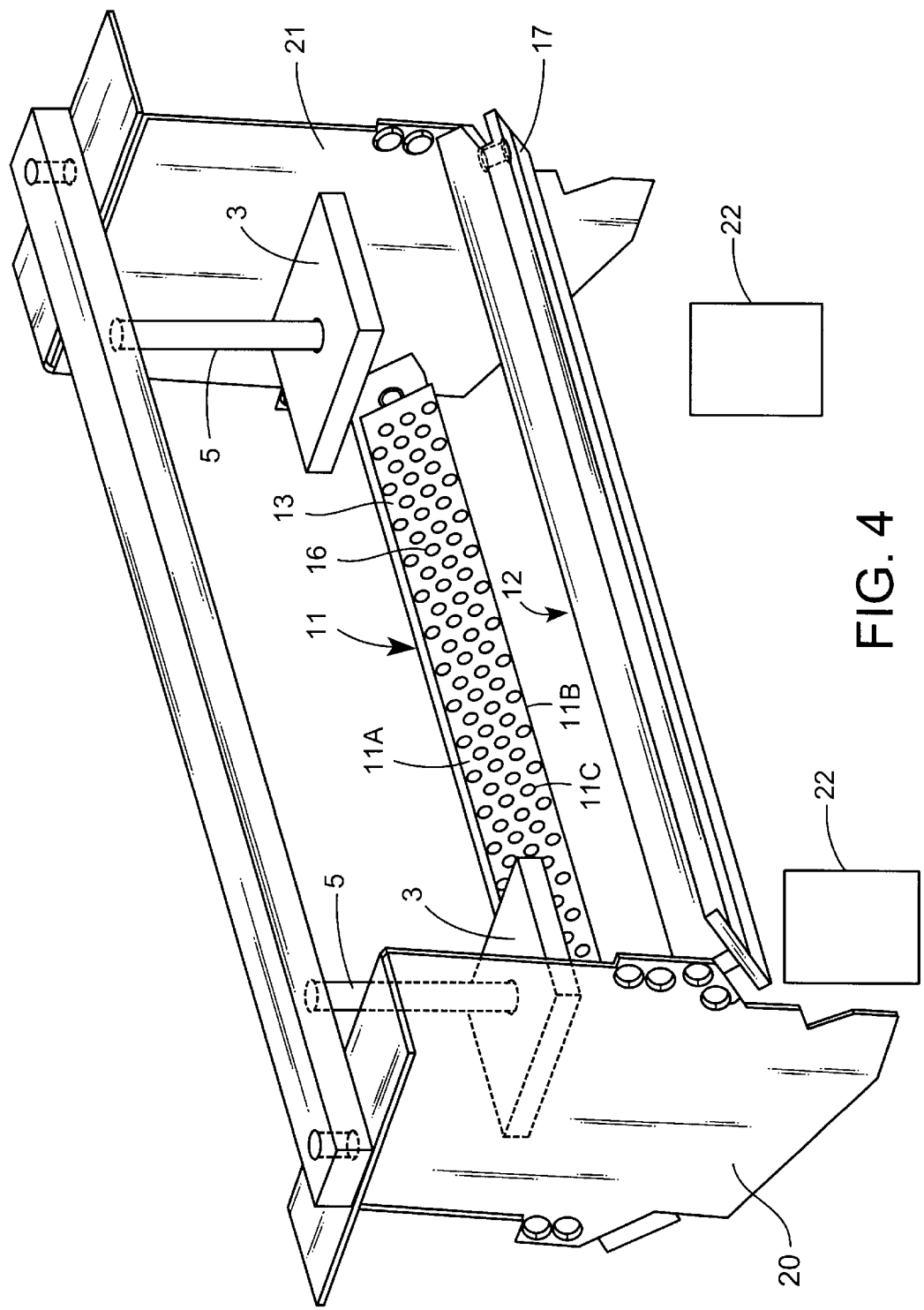
FIG. 4 is a schematic perspective view of the illumination system of FIGS. 2–3, wherein the two individual illumination front lighting assemblies are positioned at vertical angular orientations relative to the component, and also showing a camera associated with each spindle that holds a component to be illuminated.
Figure 5:
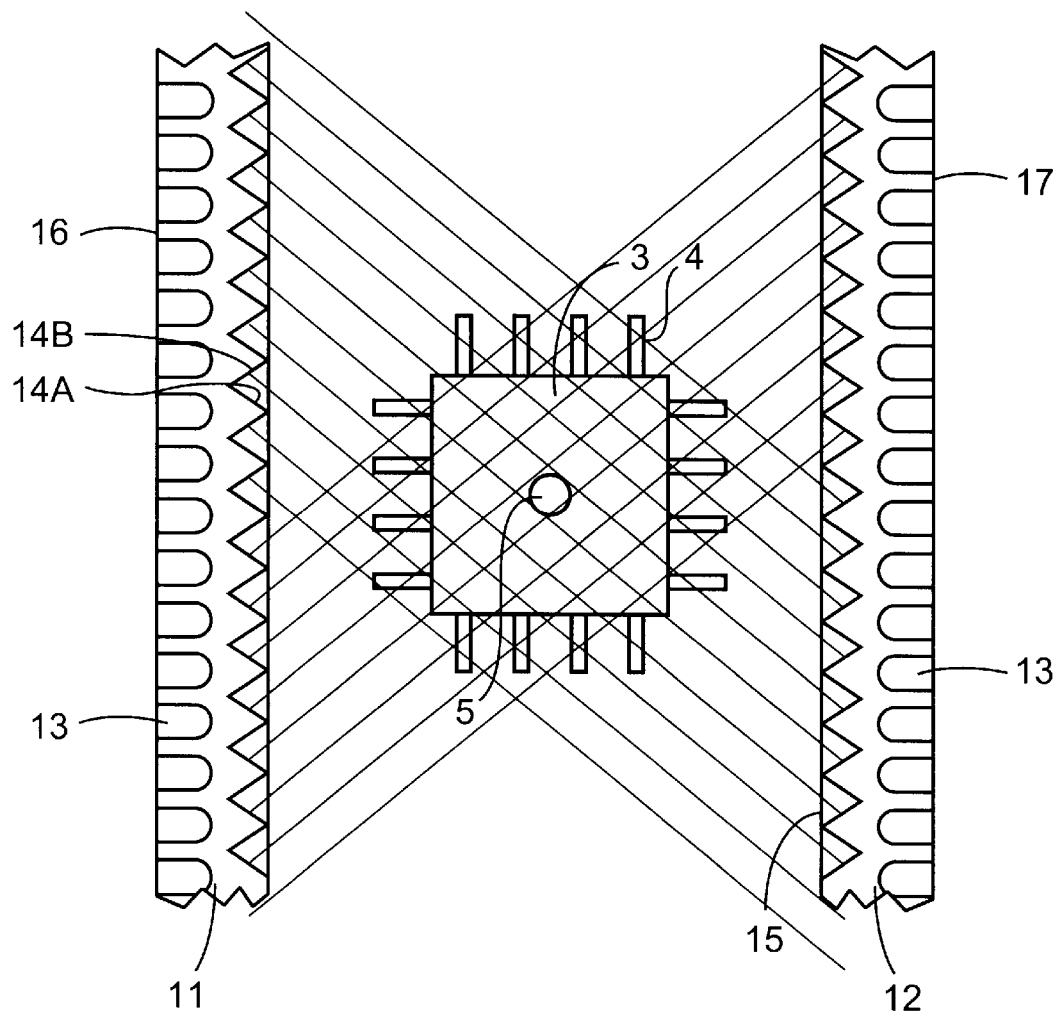
FIG. 5 is a top plan view of the embodiment shown in FIGS. 2–4, showing the manner in which the illumination system of the present invention achieves a more uniform illumination of the component.

In this embodiment, the two illumination assemblies 11 and 12 are positioned on either side of the component 3. The illumination assemblies 11 and 12 are positioned, at vertical tilt angles between 40°–50° relative to the component 3, as seen in FIG. 4, in order to provide for compound angle illumination. There is an upwardly looking camera 22 associated with each spindle 5 and component 3. The output of each camera 22 is connected to a machine vision system with appropriate image analysis software. The field of view of each camera 22 is the component 3 and any features extending therefrom, or some selected portion thereof. Cameras 22 are represented in a schematic manner in FIG. 4.

Figure 3:
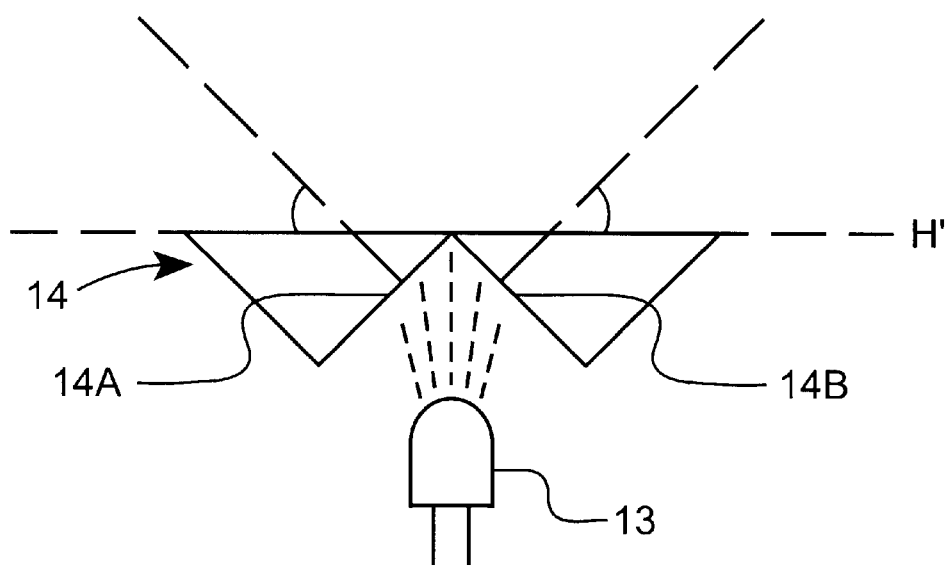
FIG. 3 is an elevational view in isolation of a portion of the illumination assembly of FIG. 2 showing the manner in which light emitted by an individual front lighting LED is refracted by the refractor prism assembly resulting in illumination light being at approximately +45° and −45° relative to a horizontal axis of the illumination assembly.

Each illumination assembly 11 and 12, in the embodiment shown in FIGS. 2–5, consists of a series of LED's 13 positioned behind surfaces 14A and 14B of refractor prism assembly 14, as best seen in FIG. 3. The surfaces 14A and 14B are such that light from each LED 13 is refracted by surfaces 14A and 14B and directed at the component 3 at an angle of approximately +45° and approximately −45° relative to the horizontal plane H', respectively, of each device 11 and 12. As a result of the arrangement shown in FIGS. 2–5, criss-cross illumination at compound angles of the component 3 is accomplished from only two sides. As seen in FIG. 4, in this embodiment, the LED's 13 in illumination assembly 11 are in three columns 11A, 11B and 11C, with alternate rows of the LED's 13 in staggered arrangement to maximize the number of LED's that can be placed in the illumination assemblies. This system is designed to provide substantially uniform illumination across the field of view of the camera 22. The camera 22 is focused on all or selected portions or features of the component, and an aspect of the present invention is to achieve substantially uniform illumination across the field of view of the camera 22.

It has been determined that the following dimensions and angles provide good illumination for the illumination assemblies 11 and 12: length of the assemblies 153 mm; 60° angles between the surfaces 14A and 14B on refractor prism assembly 14; depth of the surfaces 14A and 14B (from top to bottom) 2.7 mm, with a total of 42 combinations of surfaces 14A and 14B within the 153 mm length of the illumination assemblies 11 and 12. Acrylic has been determined to be an effective material to use for the refractor prism assemblies. The LED's 13 may be any conventional LED product, such as Hewlett Packard Model HLMT-QH00 light emitting diodes. Of course, any appropriate light sources, or refracting or focusing elements are contemplated by the present invention.

The vertical tilt angle of the illumination assemblies 11 and 12, and the refracting characteristics of the surfaces 14A and 14B of refracting prism 14 relative to the exit angle of refracted light can be chosen on a case by case basis for optimal performance of the illumination system. It has been found that approximately 45° exit angles from the surfaces 14A and 14B provide good illumination performance in most instances, and that a vertical tilt angle of 40–50° for the illumination assemblies 11 and 12 also provides good compound angle illumination.

Figure 6:
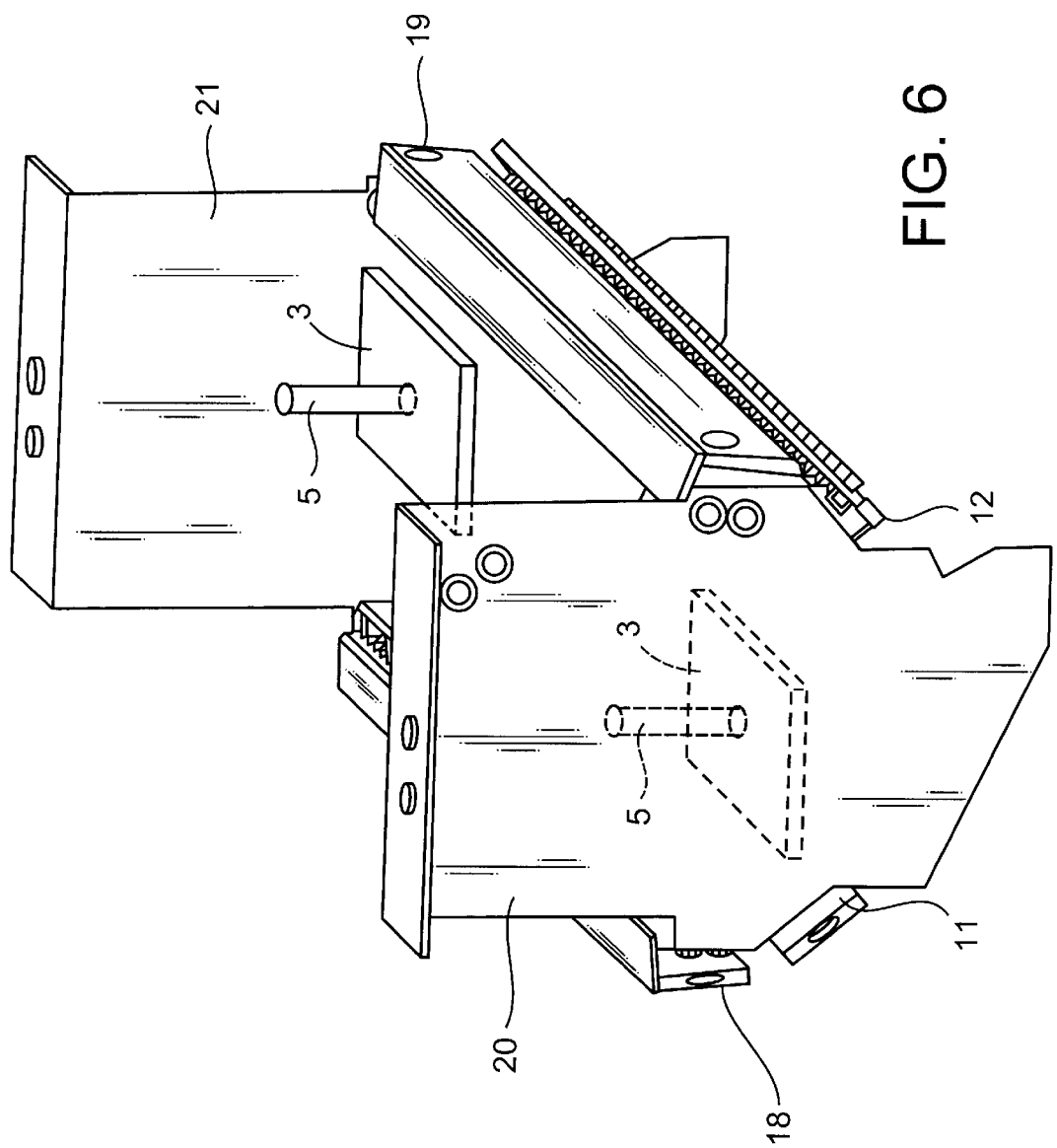
FIG. 6 is a schematic perspective view of another embodiment of the illumination system of the present invention wherein high angle illumination is provided by two side lighting illumination assemblies which are positioned at an angular orientation relative to the component.

FIG. 6 shows a further embodiment of the present invention where side lighting illumination assemblies 18 and 19 are provided for providing high angle illumination. The illumination assemblies can be constructed in the same manner with refracting prisms as in the FIGS. 2–5 embodiment, or in the embodiment shown in FIG. 1. The side lighting illumination assemblies 18 and 19 are tilted at 80°–85° relative to the optical axis of the component to provide side lighting. In essence, the side lighting illumination assemblies are almost at right angles to the component 3, as seen in FIG. 6.

In FIGS. 4 and 6, side plates 20 and 21 are reflective surfaces, or have mirrors mounted thereto, to provide light reflection for illumination of the end portions of the components 3 on end spindles 5 that are positioned at the two ends of a group of spindles.

In both FIGS. 4 and 6, it is contemplated that there will be a series of spindles 5 with components in line with one another, such that there is insufficient space for separate illumination assemblies to be interposed between the spindles, and therefore the illumination must come from only two sides of the components 3, namely from illumination assemblies 11 and 12, and, with regard to FIG. 6, also from illumination assemblies 18 and 19. Also, there is a separate camera 22 associated with each spindle/component combination.

Our invention is defined by the following claims.

What is claimed is:

1. An illumination apparatus for providing illumination of a component having features comprising:
   a camera having within its field of view the component or selected portions or features thereof;
   a first illumination assembly positioned on a first side of the component, the first illumination assembly further comprising a first plurality of sources of beams of light, wherein the first plurality of sources are oriented at a range of angles relative to a horizontal plane of the component such that the first plurality of beams of light criss-cross one another;
   a second illumination assembly positioned on a second side of the component, the second illumination assembly further comprising a second plurality of sources of beams of light, wherein the second plurality of sources are oriented at a range of angles relative to a horizontal plane of the component such that the second plurality beams of light criss-cross one another, wherein substantially uniform illumination of the field of view of the camera is obtained;

wherein sources for the first and second plurality of beams of light comprise light emitting diodes and wherein the range of angles of the plurality of beams of light is provided by a series of refractor prisms positioned over the light emitting diodes; and wherein each refracting prism has a first surface that refracts the light from an individual light emitting diode approximately +45° relative to the plane of the refracting prism and a second surface that refracts the light from an individual light emitting diode approximately −45° relative to the plane of the refractor prism.

2. A method for providing illumination of an electronic component and features of the component comprising the steps of:

providing compound angle illumination on a first side of the component with a first illumination assembly, providing compound angle illumination on a second side of the component with a second illumination assembly, wherein the first side of the component is opposite the second side of the component and no illumination is provided on any remaining sides of the component; and tilting the vertical angular orientation of the first illumination assembly relative to an axis of the component;

wherein the step of providing compound angle illumination on the first side of the component includes the step of refracting light from a light source within the first illumination assembly at approximately +45° and −45°.

3. The method of claim 2 further comprising the step of tilting the vertical angular orientation of the second illumination assembly relative to an axis of the component.

4. A method for providing illumination of an electronic component and features of the component comprising the steps of:

providing compound angle illumination on a first side of the component with a first illumination assembly, providing compound angle illumination on a second side of the component with a second illumination assembly, wherein the first side of the component is opposite the second side of the component and no illumination is provided on any remaining sides of the component; and tilting the vertical angular orientation of the first illumination assembly relative to an axis of the component;

wherein the step of providing compound angle illumination on the first side of the component includes the steps of positioning a first row of light emitting diodes within the first illumination assembly at approximately −45° and positioning a second row of light emitting diodes within the first illumination assembly at approximately +45°.

5. An illumination apparatus for providing illumination of an item having features comprising:

means for illuminating a first side of the item with compound angle illumination; and means for illuminating a second side of the item with compound angle illumination, wherein the second side of the item is opposite the first side and no illumination is provided on any other sides of the item.

6. An illumination apparatus for providing illumination of a component, the apparatus comprising:

a first illumination assembly positioned on a first side of the component, the first illumination assembly having a first plurality of light sources, the first plurality of light sources oriented so as to emit light in a first direction and in a second direction, wherein the light traveling in the first direction intersects the light traveling in the second direction; and a second illumination assembly positioned on a second side of the component, the second illumination assembly having a second plurality of light sources, the second plurality of light sources oriented so as to emit light in a third direction and in a fourth direction, wherein the light traveling in the third direction intersects the light traveling in the fourth direction;

wherein the first direction is at substantially right angles to the second direction, and the third direction is at substantially right angles to the fourth direction so that when the component is between the first illumination assembly and the second illumination assembly, light illuminates the component from four substantially equally spaced directions.

7. An illumination apparatus for providing illumination of a component, the apparatus comprising:

a first illumination assembly positioned on a first side of the component, the first illumination assembly having a first plurality of light sources, the first plurality of light sources oriented so as to emit light in a first direction and in a second direction, wherein the light traveling in the first direction intersects the light traveling in the second direction;

a second illumination assembly positioned on a second side of the component, the second illumination assembly having a second plurality of light sources, the second plurality of light sources oriented so as to emit light in a third direction and in a fourth direction, wherein the light traveling in the third direction intersects the light traveling in the fourth direction; and a support for holding the component in a plane and the first and second illumination assemblies are arranged outside the plane so that the light emitted by the plurality of light sources contacts the component at an angle between 40–50° with respect to the plane of the component.

8. An illumination apparatus for providing illumination of a component, the apparatus comprising:

a first illumination assembly positioned on a first side of the component, the first illumination assembly having a first plurality of light sources, the first plurality of light sources oriented so as to emit light in a first direction and in a second direction, wherein the light traveling in the first direction intersects the light traveling in the second direction; and a second illumination assembly positioned on a second side of the component, the second illumination, assembly having a second plurality of light sources, the second plurality of light sources oriented so as to emit light in a third direction and in a fourth direction, wherein the light traveling in the third direction intersects the light traveling in the fourth direction;

wherein the first illumination assembly includes a plurality of refractor prisms having first and second facets, wherein the first facets are oriented so as to refract light in the first direction and the second facets are oriented so as to refract light in the second direction; and wherein the second illumination assembly includes a plurality of refractor prisms having third facets and fourth facets, and each of the third facets are oriented so as to refract light in the third direction and each of the fourth facets are oriented so as to refract light in the fourth direction.

9. An illumination apparatus for providing illumination of a component, the apparatus comprising:

a first illumination assembly positioned on a first side of the component, the first illumination assembly having a first plurality of light sources, the first plurality of light sources oriented so as to emit light in a first direction and in a second direction, wherein the light traveling ill the first direction intersects the light traveling in the second direction, and a second illumination assembly positioned on a second side of the component, the second illumination assembly having a second plurality of light sources, the second plurality of light sources oriented so as to emit light in a third direction and in a fourth direction, wherein the light traveling in the third direction intersects the light traveling in the fourth direction;

wherein the first plurality of light sources includes a first group of light emitters oriented in the first direction and a second group of light emitters oriented in the second direction; and the second plurality of light sources includes a third group of light emitters oriented in the third direction and a fourth group of light emitters oriented in the fourth direction.

10. An illumination apparatus for providing illumination of a component, the apparatus comprising:

a spindle assembly for holding the component in an image plane, the spindle assembly holding the component from a first side of the image plane;

a camera for viewing the component from a second side of the image plane;

a first illumination assembly positioned on the second side of the image plane and spaced from the image plane, the first illumination assembly including a first light source oriented in a first direction so that light emitted from the first light source strikes the component in the image plane at a first angle, the first illumination assembly further including a second light source oriented in a second direction so that light emitted from the second light source strikes the component in the image plane at a second angle;

a second illumination assembly positioned on the second side of the image plane and spaced from the image plane, the second illumination assembly including a third light source oriented in a third direction so that light emitted from the third light source strikes the component in the image plane at a third angle, the second illumination assembly further including a fourth light source oriented in a fourth direction so that light emitted from the fourth light source strikes the component in the image plane at a fourth angle.

11. The apparatus of claim 10, wherein the first, second, third, and fourth angles are set so that the component is illuminated from four substantially equally spaced directions.

12. The apparatus of claim 10, wherein the first illumination assembly includes a plurality of first light sources, each of the first light sources being oriented in the first direction, the first illumination assembly includes a plurality of second light sources, each of the second light sources being oriented in the second direction, the second illumination assembly includes a plurality of third light sources, each of the third light sources being oriented in the third direction, and the second illumination assembly includes a plurality of fourth light sources, each of the fourth light sources being oriented in the fourth direction.

13. An apparatus for illuminating a component having features from four directions, the apparatus comprising:

a camera having a focal plane within a field of view;

a first illumination assembly having a plurality of first light sources for projecting first and second beams of light at an angle incident to the focal plane at approximately +45 degrees and −45 degrees toward the focal plane such that the beams at +45 degrees intersect the beams at −45 degrees;

a second illumination assembly opposite the first illumination assembly;

the second illumination assembly having a plurality of second light sources for projecting third and fourth beams of light at an angle incident to the focal plane at approximately +45 degrees and −45 degrees toward the focal plane such that the beams at +45 degrees intersect the beams at −45 degrees; and wherein when the component is positioned at the focal plane the features are illuminated from four directions from the first illumination assembly and the second illumination assembly.

14. The apparatus of claim 12, wherein the angle incident to the focal plane for both the first illumination assembly and the second illumination assembly is in the range of 40 to 50 degrees.

15. The method of claim 4 further comprising the step of tilting the vertical angular orientation of the second illumination assembly relative to an axis of the component.

* * * * *